United States Patent [19]

Tamura et al.

[11] 4,162,613
[45] Jul. 31, 1979

[54] EXHAUST GAS PURIFIER OF AN INTERNAL COMBUSTION ENGINE

[75] Inventors: Tetsuomi Tamura, Toyota; Koichi Mizutani, Seto, both of Japan

[73] Assignee: Toyota Jidosha Kogyo Kabushiki Kaisha, Aichi, Japan

[21] Appl. No.: 863,072

[22] Filed: Dec. 22, 1977

Related U.S. Application Data

[63] Continuation of Ser. No. 674,238, Apr. 6, 1976, abandoned.

[30] Foreign Application Priority Data

Dec. 26, 1975 [JP] Japan .................... 50-154848

[51] Int. Cl.² .................... F01N 3/10; F02M 25/06
[52] U.S. Cl. .................... 60/278; 60/293; 60/305
[58] Field of Search .................... 60/293, 278, 282, 305, 60/304, 323

[56] References Cited

U.S. PATENT DOCUMENTS

| | | | |
|---|---|---|---|
| 3,500,807 | 3/1970 | Daigh | 60/278 |
| 3,662,541 | 5/1972 | Sawada | 60/293 |
| 3,906,724 | 9/1975 | Yoshizaki | 60/305 |
| 3,934,411 | 1/1976 | Masaki | 60/305 |
| 4,022,019 | 5/1977 | Garcea | 60/323 |

*Primary Examiner*—Douglas Hart
*Attorney, Agent, or Firm*—Stevens, Davis, Miller & Mosher

[57] ABSTRACT

An exhaust gas purifier for a four-stroke internal combustion engine has a plurality of cylinders consisting of cylinder groups, each of which has at least two cylinders, and the opening durations of the exhaust valves in any one group do not overlap. The exhaust passages of the cylinders of one of the cylinder groups are connected to the atmosphere via a common reed valve.

9 Claims, 11 Drawing Figures

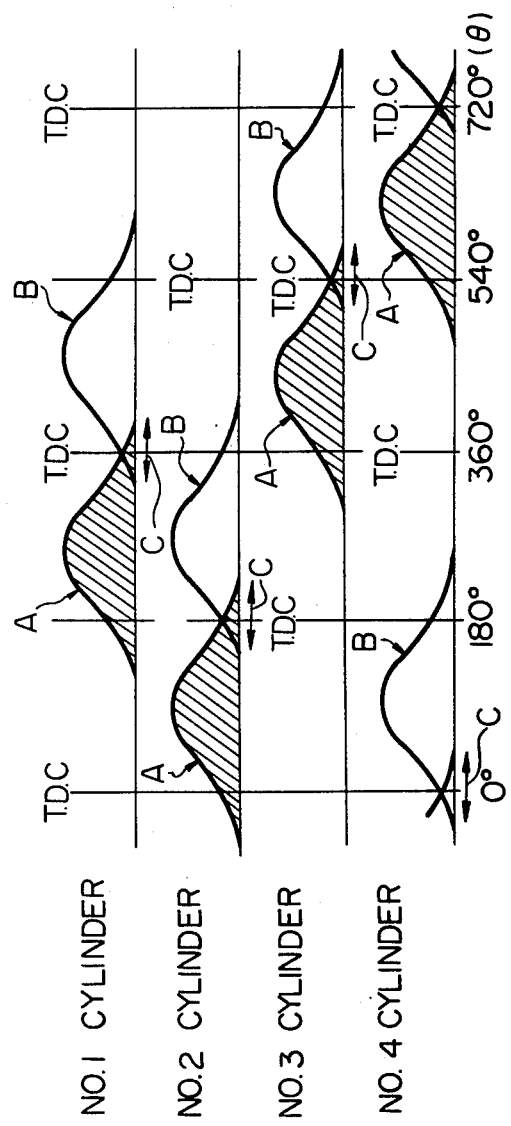

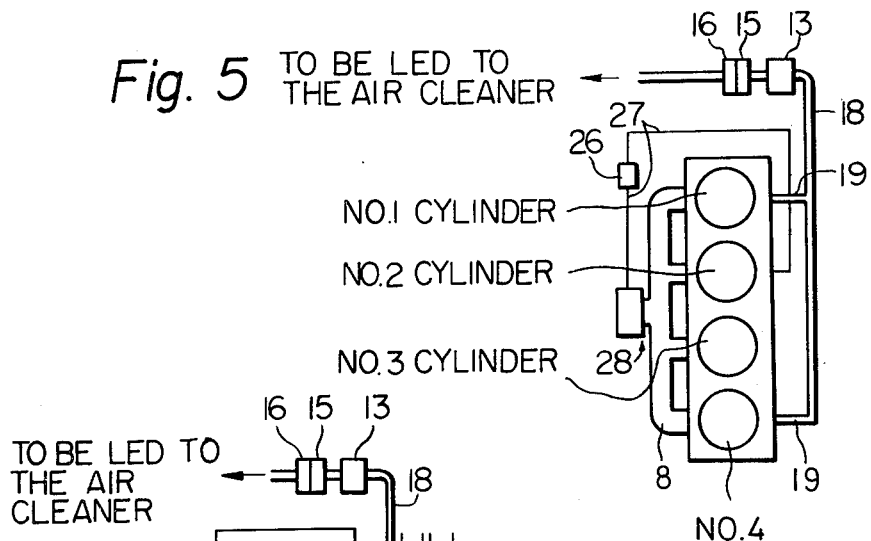
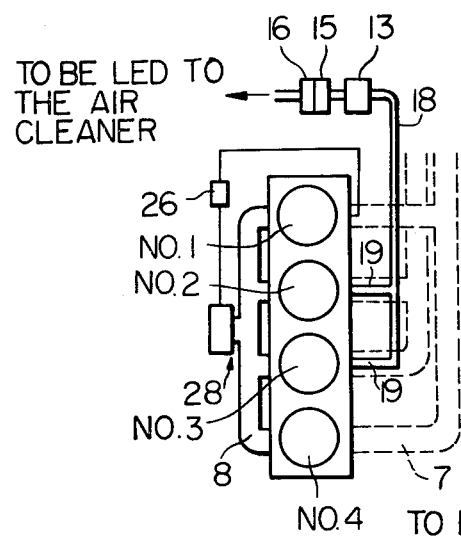
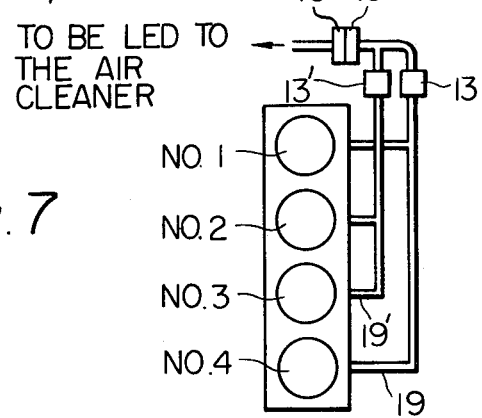

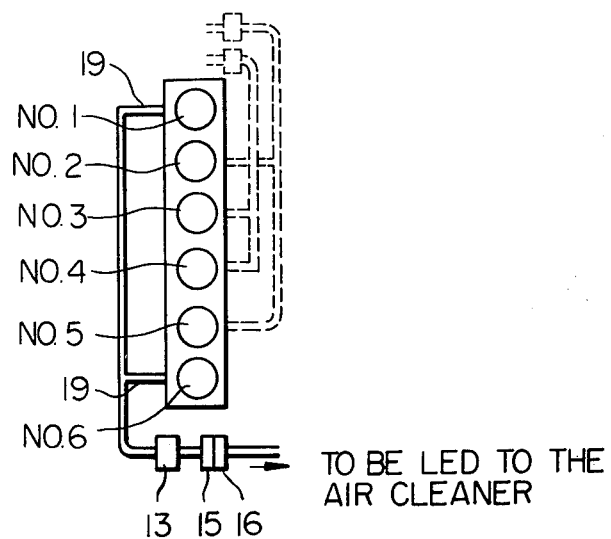
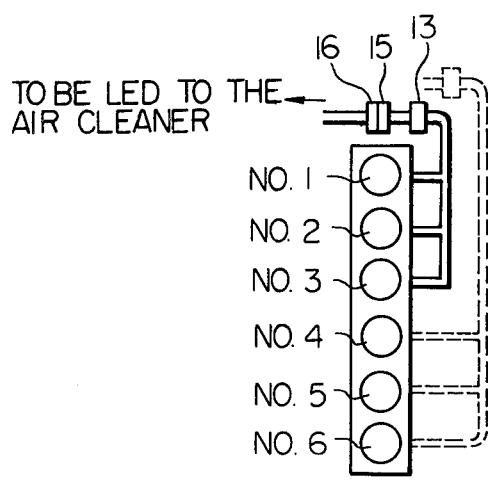

EXHAUST GAS PURIFIER OF AN INTERNAL COMBUSTION ENGINE

This ia s continuation of application Ser. No. 674,238 filed Apr. 6, 1976, now abandoned.

DESCRIPTION OF THE INVENTION

The present invention relates to an exhaust gas purifier for an internal combustion engine.

Known internal combustion engines are provided with exhaust gas purifiers which use catalytic converters for eliminating harmful components from the exhaust gas, for example unburned gases HC and CO. In conventional catalytic converters of this type, secondary air is fed to the catalytic converter by means of the secondary air feed pump driven by the engine and thus the oxidation of unburned HC and CO is promoted in the catalytic converter, thereby eliminating harmful components from the exhaust gas. Consequently, conventional exhaust gas purifiers need to be provided with the secondary air feed pump.

An object of the present invention is to provide an improved exhaust gas purifier of a simple construction without the above-mentioned secondary air feed pump.

According to the present invention, an improved exhaust gas purifier in a four-stroke internal combustion engine having a plurality of cylinders each having an intake valve, an exhaust valve and an exhaust passage, said cylinders being arranged in cylinder groups each of which group comprises at least two cylinders, the opening durations of the exhaust valves in any one group not overlapping, wherein the improvement comprises;

at least one air passage for connecting the exhaust passages of the cylinders of one of said cylinder groups with the atmosphere, and a valve means disposed in said air passage and arranged to open automatically in response to a decrease in pressure below a predetermined value in the exhaust passages of the cylinders of said one cylinder group to permit the supply of an air into the exhaust passages of the cylinders of said one cylinder group.

The above-mentioned object of the invention may be more fully understood from the following description of a preferred embodiment of the invention and from the accompanying drawings.

BRIEF DESCRIPTION OF THE DRAWINGS

In the drawings:

FIG. 4 is a view showing the valve lifts of an intake valve and an exhaust valve of each cylinder in a four-cylinder engine;

FIG. 5 is a schematic plane view of an embodiment showing the possible combinations of the cylinders which the branch conduits should be connected to;

FIG. 6 is a view similar to FIG. 5, showing another embodiment;

FIG. 7 is a view similar to FIG. 5, showing the other embodiment;

FIG. 9 is a schematic plan view of an embodiment showing the various possible combinations of cylinders which the branch conduits should be connected to;

FIG. 10 is a view similar to FIG. 9, showing another embodiment, and;

DESCRIPTION OF A PREFERRED EMBODIMENT

Figure 1:
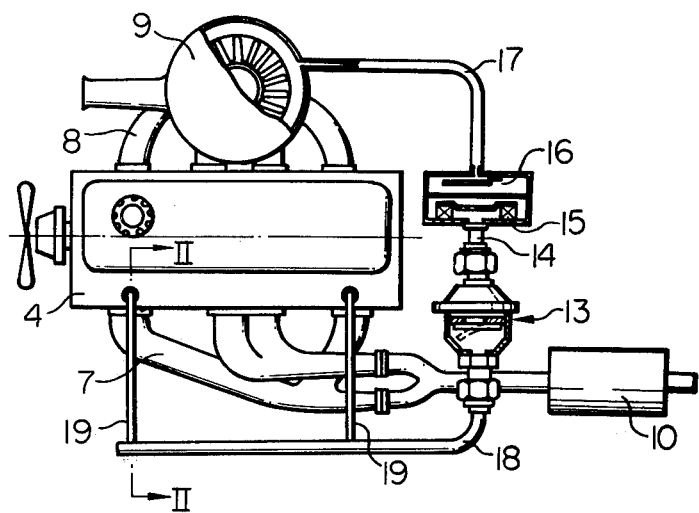
FIG. 1 is a schematic plane view of an internal combustion engine having the exhaust gas purifier according to the present invention.
Figure 2:
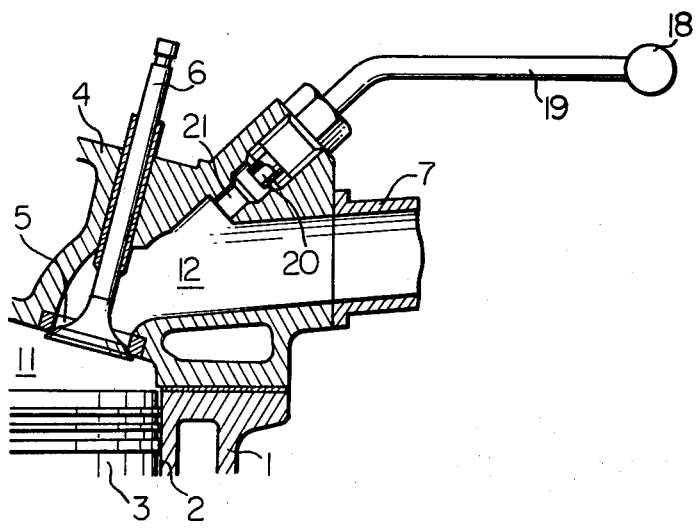
FIG. 2 is a cross-sectional view taken along the line II—II in FIG. 1.

FIG. 1 shows a schematic plan view of the internal combustion engine having the exhaust gas purifier according to the present invention and FIG. 2 shows a cross-sectional view of a part of the engine shown in FIG. 1. Referring to FIGS. 1 and 2, the internal combustion engine comprises a cylinder block 1, a piston 3 reciprocatively movable in the cylinder 2 formed in the cylinder block 1, a cylinder head 4 fixed onto the cylinder block 1, an intake valve (not shown), an exhaust valve 6 for controlling the opening and closing operation of an exhaust port 5, an exhaust manifold 7 and an intake manifold 8 which are fixed onto the cylinder head 4, an air cleaner 9 mounted on the intake manifold 8 and a catalytic converter 10. The gas to be exhausted which has been burned in a combustion chamber 11 is delivered into the catalytic converter 10 through the exhaust manifold 7, and then, the gas cleaned in the catalytic converter 10 is delivered to the atmosphere.

Figure 3:
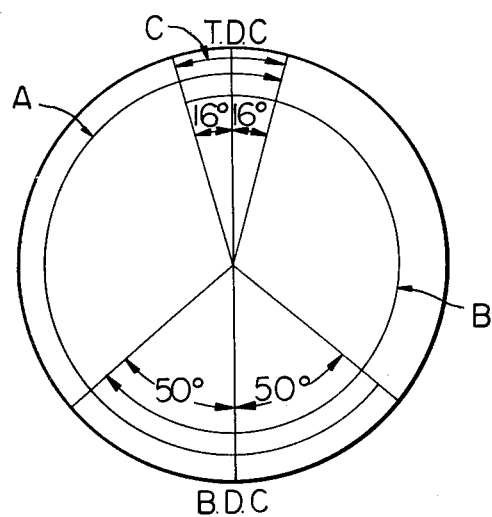
FIG. 3 is a view showing intake- and exhaust-valve timing.

FIG. 3 shows the intake- and exhaust-valve timing. In a conventional internal combustion engine having an intake valve and an exhaust valve, a duration of overlap between the intake valve and the exhaust valve occurs during which both the intake and the exhaust valves are in an opened position immediately before the exhaust valve is closed. As is shown in FIG. 3, for example, the exhaust valve A opens 50° before BDC (Bottom dead center) and closes 16° after TDC (Top dead center), and the intake valve B opens 16° before TDC and closes 50° after BDC. Consequently, as is shown by arrow C, a duration of overlap occurs when both exhaust valve A and the intake valve B are each in an opened position.

In FIG. 2, assuming that the engine is in an exhaust stroke position during which the exhaust valve 6 is in an opened position, the gas to be exhausted in the combustion chamber 11 is delivered into the catalytic converter 10 via the exhaust valve port 5, the exhaust port 12 and the exhaust manifold 7 as the piston 3 is moved upwards in the cylinder 2. At this time, the pressure in the exhaust port 12 and in the branch portion of the exhaust manifold 7 is greater than the atmospheric pressure. Then, when the intake valve opens and piston 3 is further moved upwards so as to reach its uppermost position (TDC), the pressure in the exhaust port 12 and in the branch portion of the exhaust manifold 7 becomes substantially the same as the atmospheric pressure. Then, when the piston 3 begins to move downwards, the fuel mixture is sucked into the combustion chamber 11 via the intake port (not shown). At this time, the exhaust valve 6 is still in an opened position. Thus, a part of the exhaust gas in the exhaust port 12 is again sucked into the combustion chamber 11, whereby the pressure in the exhaust port 12 and in the branch portion of the exhaust manifold 7 becomes slightly lower than the atmospheric pressure. As is aforementioned, if both the intake valve and the exhaust valve 6 are in opened positions during the time when the piston has a position at about TDC, the pressure in the exhaust port 12 and in the branch portion of the exhaust manifold 7 approaches that of a vacuum. According to the invention, the internal combustion engine is provided with an automatically opening and closing reed valve 13 known per se in order to feed secondary air for promoting the oxidation of unburned gas into the exhaust port 12 by using said vacuum, or by using the fluctuations of the exhaust gas pressure, said fluctuations are created by the opening and closing operation of the exhaust valve 6 and the intake valve. The reed valve 13 is connected to the dust portion of the air cleaner at a position opposite to the air inlet opening in the air cleaner 9 via conduit 14, an air filter 15 for filtering the secondary air, a silencer 16 for stopping the suction noise of the secondary air and a conduit 17, on one hand; and to a predetermined number of exhaust ports 12, as will be hereinafter explained, via an air suction manifold 18, branch conduits 19, air suction nozzles 20 disposed on the front ends of the branch conduits 19 and passages 21 formed in the cylinder head 4, on the other hand. The reed valve 13 opens when the pressure in the branch conduits 19 becomes slightly lower than that in the conduit 17, i.e., the atmospheric pressure, or when a decrease in the pressure greater than a predetermined value takes place in the branch conduits 19. Consequently, when the pressure in the exhaust port 12 becomes similar to that in a vacuum or when a pressure drop takes place in the exhaust port 12, air is sucked into the exhaust port 12 from the air cleaner 9 via the conduit 17, the silencer 16, the air filter 15, the conduit 14, the reed valve 13, the air suction manifold 18, the branch conduits 19, the air suction nozzles 20 and the passages 21.

An internal combustion engine used for an automobile, for example, is generally provided with four, six or eight cylinders. Of course, it is possible to provide the reed valves and the air filters for every cylinder, however, this causes an increase in costs and difficulties in construction. Furthermore, it has been found that, for example, in an internal combustion engine having four cylinders, if the secondary air is fed into the exhaust passages, i.e., the exhaust port 12 or the branch portion of the exhaust manifold 7 of only two of the four cylinders, it is possible to supply the exhaust gas with a sufficient amount of air which is needed for effectively promoting the oxidation in the catalytic converter. Consequently, consideration must be directed as to which exhaust passages among those of the four cylinders the secondary air should be fed into.

As is shown in FIGS. 5 through 7, assuming that an internal combustion engine is provided with four cylinders comprised of No. 1 cylinder, No. 2 cylinder, No. 3 cylinder and No. 4 cylinder, and the firing order in this engine is No.1-No.3-No.4-No.2, the exhaust- and intake-valve timing in each cylinder is as shown in FIG. 4. In FIG. 4, the abscissa indicates the crank angle $\Theta$ and the ordinate indicates the valve lift of the exhaust valve and the intake valve in each cylinder. Each of the A curves indicated by the hatched line shows the respective exhaust valve lifts in No. 1 No. 4 No.4 cylinders, and each of the B curves shows the respective intake valve lifts in No. 1 through No. 4 cylinders. Furthermore, the duration of an overlap between the exhaust valve and the intake valve is shown by C.

It is assumed that branch conduits 19 which are connected to a single reed valve 13 having the air filter 13 are connected to No. 1 and No. 2 cylinders, respectively. In this case, it is apparent from FIG. 4 that when the intake valve and the exhaust valve of No. 2 cylinder, are, in a durational phase of an overlap and thus the pressure in the exhaust port 12 of No. 2 cylinder is similar to that in a vacuum, the exhaust valve A of No. 1 cylinder is in an opened position. Thus, the pressure in the exhaust port 12 of No. 1 cylinder is greater than the atmospheric pressure. As a result, the reed valve 13 is closed by the action of the pressure created in the exhaust port of No. 1 cylinder. Consequently, in spite of the creation of the vacuum and the occurrence of the pressure drop in the exhaust port of No. 2 cylinder, the secondary air cannot be fed into the exhaust port of No. 2 cylinder. That is to say, if the branch conduits 19 are connected to said two cylinders that, when the intake valve and the exhaust valve of one of the cylinders are in the durational phase of an overlap, then, the exhaust valve of the other cylinder is in an opened position. In other words, when said two cylinders are subjected to a condition wherein the opening durations of the exhaust valves of both cylinders overlap with each other, secondary air cannot be fed into one of the two cylinders under the influence of the other cylinder.

Consequently, in order to supply two cylinders with secondary air, the branch conduits 19 must be connected to said two cylinders such that the opening durations of the exhaust valves of both cylinders do not overlap with each other. Furthermore, it is very effective in the operation of supplying the secondary air to divide an exhaust manifold into two separate exhaust manifolds, one of which is used for said two cylinders, the other exhaust manifold being used for the remaining cylinders.

Referring to FIG. 5 while taking into consideration the above, the possible combinations of two cylinders which should be connected to the single reed valve 13 are either the combination of No. 1 cylinder with No. 4 cylinder as shown in FIG. 5 or the combination of No. 2 cylinder with No. 3 cylinder as shown in FIG. 6. In either case, as aforementioned, it is further effective to divide an exhaust manifold into two separate exhaust manifolds as shown in FIG. 1 and as shown by the broken line in FIG. 6. Although the engine construction is made slightly more complicated, in order to supply all of the cylinders with the secondary air, as shown in FIG. 7, the engine may be provided with the branch conduits 19 connected to No. 1 cylinder and No. 4 cylinder, the reed valve 13 connected to the branch conduits 19, the branch conduits 19' connected to No. 2 cylinder and No. 3 cylinder, the reed valve 13' connected to the branch conduits 19' and the air filter 15 connected to the reed valves 13 and 13'.

Figure 11:
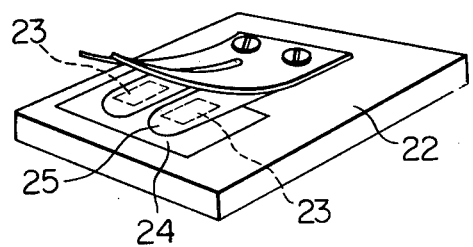
FIG. 11 is a prospective view of the reed valve.
Figure 8:
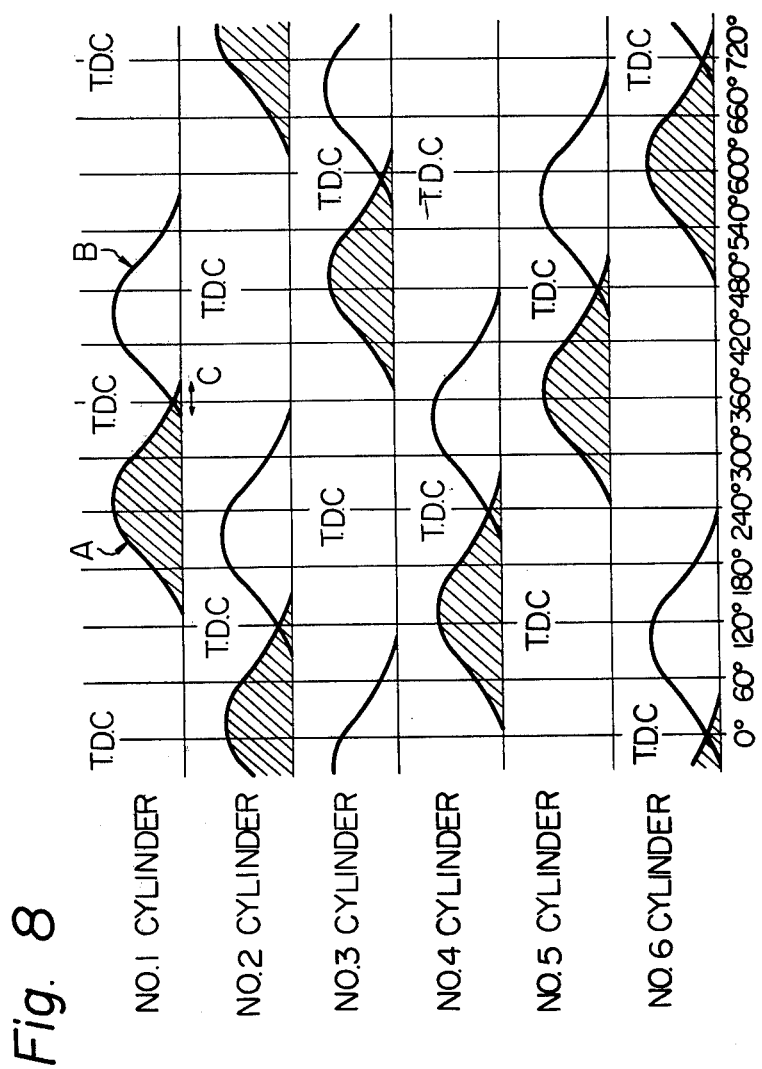
FIG. 8 is a view showing the valve lifts of an intake valve and an exhaust valve of each cylinder in a six-cylinder engine.

FIGS. 8 and 10 show another embodiment in the case of applying the present invention to a six-cylinder engine. In FIGS. 8 through 10, the description of the components is omitted because FIG. 8 is depicted in a similar manner as FIG. 4 and also FIGS. 9 and 10 are depicted in a similar manner as FIGS. 5 through 7. Referring to FIG. 8, in a six-cylinder engine, the possible combination of two cylinders which should be connected to the single reed valve 13 is, for example, the combination of No. 1 cylinder with No. 6 cylinder, or the combination of No. 2 cylinder with No. 5 cylinder, or the combination of No. 3 cylinder with No. 4 cylinder as shown in FIG. 9 Furthermore, in a six-cylinder engine, three cylinders such as No. 1, No. 2 and No. 3 cylinders or No. 4, No. 5 and No. 6 cylinders can be combined and connected to the single reed valve 13. That is to say, it is possible to combine said three cylinders in such a way that the crank angles of these three cylinders, which cause the opening of the intake valves, are 240° apart from one another. In the case of combining the above-mentioned three cylinders, these three cylinders are affected much more by the remaining cylinders than would the two cylinders be affected by the remaining cylinders in the case of combining two cylinders, crank angles for opening the intake valves of said two-cylinders being 360° apart from each other. However, when it is sufficient to supply a small amount of a secondary air to the above-mentioned three cylinders connected to the single reed valve, the combination of three cylinders can be used. Of course, in FIGS. 9 and 10, the engine is provided with a plurality of reed valves and with a single air filter as shown in FIG. 7, thereby feeding a secondary air into all of the cylinders. FIG. 11 shows the reed valve. The reed valve comprises a reed valve body 22, a valve seat 24 forming thereon a pair of valve ports 23 and a pair of valves 25 normally closing the valve ports 23.

In the embodiment shown in FIG. 1, the passage 21 connected to the branch conduit 19 opens into the exhaust port 12. However, the branch conduit 19 may directly open into the branch portion of the exhaust manifold 7.

As is described hereinbefore, according to the present invention, the exhaust gas purifier of an extremely simple construction ensures the feeding of secondary air into the exhaust passages.

Furthermore, as shown in FIGS. 5 and 6, if the exhaust gas delivered from the cylinder which is not connected to the reed valve 13 is recirculated into the intake air system 28, for example the intake manifold 8 via an exhaust recirculation control valve 26 for controlling the flow rate of the exhaust gas and an exhaust gas passage 27, said exhaust gas containing no air, that is to say, inert gas can be recirculated into the intake manifold, thereby bringing about an effective reduction of the harmful component $NO_x$ in the exhaust gas. Furthermore, if the duration of an overlap between the intake valve and the exhaust valve in each cylinder which is connected to the reed valve is extended compared with those durations in the remaining cylinders not connected to the reed valve, thereby increasing the feed amount of secondary air into the former cylinders, it is then possible to improve the purifying efficiency and also improve the engine performance.

In addition, the atmospheric side of the reed valve 13 is connected to the dust portion of the air cleaner 9 at a position opposite to the air inlet opening in the air cleaner 9 via the air filter 15 and the silencer 16. Thus, when the occurrence of a malfunctioning of the reed valve 13 causes the exhaust gas to reverse and flow into the air cleaner via the branch conduit 19, the conduits 18 and 17, the exhaust gas must not be delivered to the atmosphere; and said gas can be sucked again into the combustion chamber.

The present invention is hereinbefore described with a reference to the preferred embodiment in which the engine is provided with a catalytic converter in its exhaust system. However, the catalytic converter can be replaced by a manifold reactor or an after-burner.

What is claimed is:

1. An exhaust gas purifier in a four-stroke internal combustion engine having an exhaust passage and an air cleaner having therein a dust portion and a clean portion which is connected to a cylinder of the engine, said purifier comprising: a secondary air conduit communicating said dust portion with said exhaust passage; a silencer disposed in said secondary air conduit; a reed valve disposed in said secondary air passage between said silencer and said exhaust passage and arranged to open automatically in response to a decrease in pressure below a predetermined value in said exhaust passage to permit the supply of a secondary air into said exhaust passage; and an air filter disposed in said secondary air passage between said silencer and said reed valve.

2. An exhaust gas purifier as claimed in claim 1, wherein said engine has a plurality of cylinders each having an intake valve, an exhaust valve and an exhaust passage, said cylinders being arranged in cylinder groups each of which group comprises at least two cylinders, the opening durations of the exhaust valves in any one group not overlapping, said secondary air passage being connected to the exhaust passages of cylinders of one of said cylinder groups.

3. An exhaust gas purifier as claimed in claim 2, wherein the exhaust passages not connected with said secondary air passage are connected to an intake, manifold of the engine via an exhaust recirculation control valve.

4. An exhaust gas purifier as claimed in claim 2, wherein said cylinder group comprising the cylinders connected to said dust portion via said secondary air conduit is provided with an exhaust manifold which is independent of the remaining cylinders.

5. An exhaust gas purifier as claimed in claim 4, wherein said remaining cylinders not connected with said secondary air passage are provided with a common exhaust manifold.

6. An exhaust gas purifier as claimed in claim 2, wherein the durations of the overlap of the intake valves with the exhaust valves in the cylinders connected with said secondary air passage are longer than those in the remaining cylinders not connected with said secondary air passage.

7. An exhaust gas purifier as claimed in claim 1, wherein said purifier further comprises a catalytic converter in the exhaust passage of the engine.

8. An exhaust gas purifier as claimed in claim 1, wherein said purifier further comprises a manifold reactor in the exhaust passage of the engine.

9. An exhaust gas purifier as recited in claim 1, wherein said purifier further comprises a thermal-reactor in the exhaust passage of the engine.

* * * * *